March 3, 1953  F. W. JARDON ET AL  2,629,877
ARTIFICIAL EYE
Filed April 27, 1946  2 SHEETS—SHEET 1
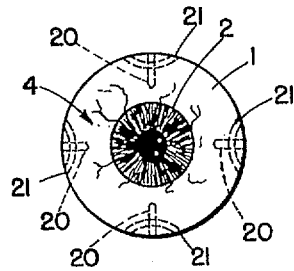
Fig. I
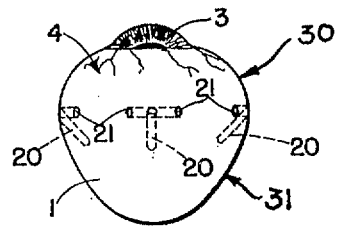
Fig. II
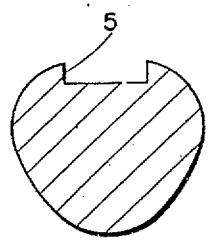
Fig. III
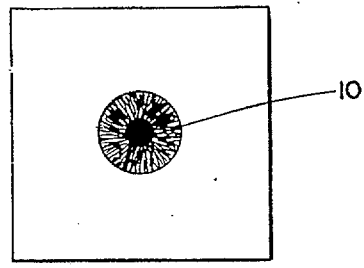
Fig. IV
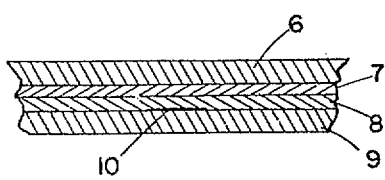
Fig. V
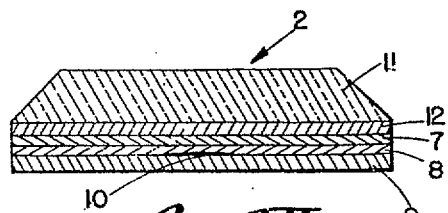
Fig. VI
INVENTORS
FRITZ W. JARDON
ALBERT D. RUEDEMANN
BY
*Louis L. Gagnon*
ATTORNEY March 3, 1953  F. W. JARDON ET AL  2,629,877
ARTIFICIAL EYE
Filed April 27, 1946  2 SHEETS—SHEET 2
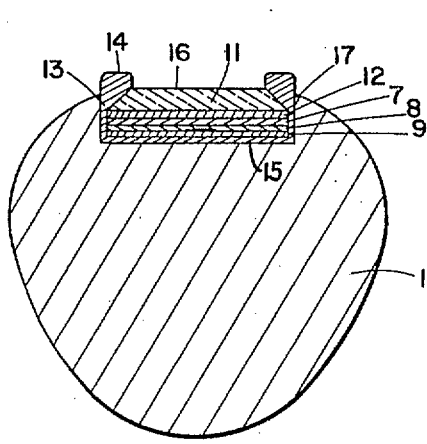
Fig. VII
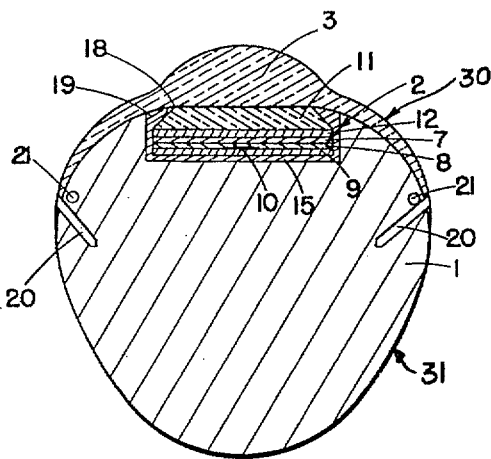
Fig. VIII
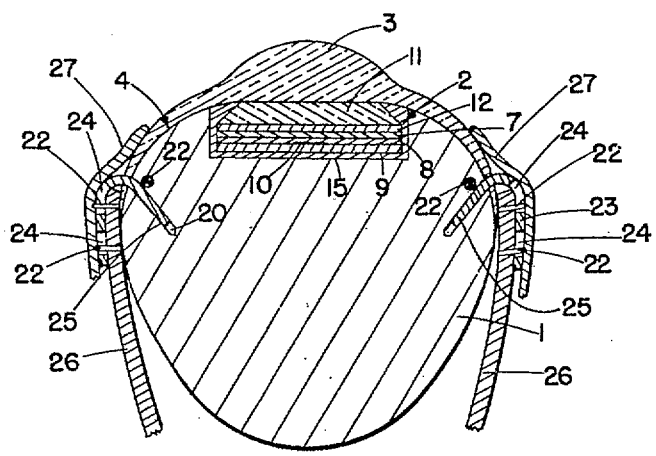
Fig. IX
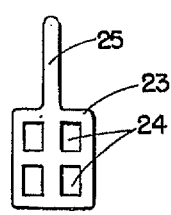
Fig. X
INVENTORS
FRITZ W. JARDON
ALBERT D. RUEDEMANN
BY
Louis L. Gagnon
ATTORNEY Patented Mar. 3, 1953

2,629,877

UNITED STATES PATENT OFFICE 2,629,877

ARTIFICIAL EYE

Fritz W. Jardon, Charlton Depot, Mass., and Albert D. Ruedemann, Cleveland, Ohio, assignors of one-half to American Optical Company, Southbridge, Mass., a voluntary association of Massachusetts, and one-half to The Cleveland Clinic Foundation, Cleveland, Ohio, a corporation of Ohio Application April 27, 1946, Serial No. 665,522

21 Claims. (Cl. 3—13)

This invention relates to artificial eyes and has particular reference to an artificial eye permanently connected with the motive muscular structure of the eye of the individual whereby the said eye will have the appearance of and move in a manner similar to the movements of the normal eye.

One of the principal objects of the invention is to provide an artificial eye formed of a plastic material which is particularly resistant to socket secretions, which is non-irritant to the body tissues and which will be light in weight and nonfrangible and which may be permanently connected with the motive muscular structure of the eye and parts of the eye tissues including the conjunctiva which is partially drawn over the eye so that the eye remains permanently in place and will have the appearance and motive function of a normal eye and has particular reference to the method of making the same.

Another object is to provide an artificial eye composed of plastic materials and method of making the same whereby the iris will closely resemble the iris of the normal eye of an individual as to size, color, shape, depth, size of pupil and general appearance.

Another object is to provide simple, efficient and economical means and method of producing an artificial eye of the above character whereby the motive muscles of the eye replaced by said plastic eye may be relatively simple and efficiently attached to said artificial eye.

Other objects and advantages of the invention will become apparent from the following description taken in connection with the accompanying drawings and it will be apparent that many changes in the details of construction, arrangement of parts, and method shown and described may be made without departing from the spirit of the invention as expressed in the accompanying claims. It, therefore, is in no way intended that the invention be limited to the exact details of construction, arrangement of parts and method shown and described as the preferred form only has been given by way of illustration.

Referring to the drawings:

Fig. I is a front elevational view of an eye formed according to the present invention;

Fig. II is a side elevational view of said eye;

Fig. III is a sectional view of the ball portion of the eye illustrating a step in the process of manufacture;

Fig. IV is a face view of the film portion embodied in forming the iris portion of the eye;

Fig. V is a fragmentary sectional view of a further step in the process of manufacture and illustrating the development of the iris portion;

Fig. VI is an enlarged sectional view illustrating a further step in the process of manufacture;

Fig. VII is a view generally similar to Fig. III illustrating a further step in the process of manufacture;

Fig. VIII is a view generally similar to Fig. III illustrating a further step in the process of manufacture;

Fig. IX is a diagrammatic view illustrating the method of securing the artificial eye within the socket and to the eye motive muscles of the individual; and Fig. X is a face view of an attachment plate used in connecting the muscles to the eye embodying the invention.

The eye embodying the present invention, as distinguished from known prior art artificial eyes which were merely held in place by the eyelids, is fabricated from carefully selected materials and with structural features enabling the said eye to be permanently secured within the patient's eye socket at the time that the patient's deficient eye is being removed.

The said eye further distinguishes from artificial eyes of the known prior art type in that it is provided with means whereby the motive muscular structure of the eye being removed may be attached to the artificial eye and will impart movements thereto simulating those of the normal eye.

A further distinction is that the eye of the present invention is extremely light in weight, may be altered as to shape so as to meet the requirements of the particular individual and is carefully controlled as to color and size of iris as well as the pupil and scleral vein pattern so as to closely resemble the size and appearance characteristics of the normal eye.

The eye is particularly resistant to breakage, will retain its color characteristics and is of such nature as to be non-irritating to the socket tissues and more particularly is greatly resistant to changes in temperature and to socket secretions.

Referring more particularly to the drawings wherein like characters of reference designate like parts throughout the several views, the artificial eye embodying the invention comprises three major parts, the main ball portion 1, the iris portion 2, and the transparent covering 3.

The ball portion 1 is provided with a scleral portion 4 formed to simulate the scleral portion of the normal eye of an individual. In forming the artificial eye of the present invention the ball portion 1 is molded to the size and shape desired and is preferably formed of a whitish translucent plastic material, such as methyl methacrylate having white or other desired color pigments added thereto. The said ball portion 1 is preferably molded to shape in a suitable mold made of plaster or other desired means by placing the plastic in a doughy state in the mold and then subjecting the said mold to heat and pressure of an amount sufficient to cause the plastic to assume the shape of the mold cavity. It, of course, is to be understood that the mold cavity is of the shape and size desired of the ball portion.

In the front portion of the ball portion 1 there is formed a countersink or recess 5 in the position where the iris is to be located and is of substantially the same diameter as the iris to be formed in the resultant eye.

The iris portion is preferably a photograph of the good eye of the individual or is a photograph selected from a stock of negatives and which possesses the major characteristics of the individual's good eye. From this negative a positive is formed on a transparent stripping film. This particular type of film, as shown diagrammatically in Figs. IV and V, has a relatively thick backing 6 of cellulose acetate adapted to support a superimposed very thin layer 7 of cellulose nitrate. On the layer of cellulose nitrate there is a layer 8 of gelatin which contains photographic materials such as photosensitive compound. Other compounds such as bromide or iodide or mixtures thereof may be used which, when exposed and developed, will cause the layer to contain a photographic picture of the eye in different tones varying from black to the transparent depending upon the photographic pattern of the iris.

The color effect of the iris of the good eye is reproduced on this film by suspending an inorganic pigment in a syrupy liquid consisting of methyl methacrylate polymer dissolved in methyl methacrylate monomer or partially polymerized methyl methacrylate which may contain a plasticizer such as dibutyl phthalate or the like. The color of the inorganic pigment used, of course, is selected according to the color of the eye to be produced and one or more of several different colors may be used and placed on the gelatin layer containing the photographic picture of the iris by painting or brushing streaks or bands of said color or colors thereon depending upon the effect to be produced. The pigment is essentially opaque and thereby causes the pigmented coating 9 resulting from the above to be an opaque layer.

It is to be understood, of course, that the pupil is first produced on the film by applying a coating of black pigment in a syrupy liquid to the pupil area of the photographic film after which the pigmented coating 9 is applied or the pupil may be produced photographically, thereby requiring no painting. In instances when it is painted a transparent pupil area is formed during the photographic process. The pupil area is indicated at 10 and is controlled in size during the forming thereof so as to appear to be substantially the size of the pupil of the normal eye under normal conditions of use.

The monomer which acts as a solvent for the pigmented layer partially evaporates after being applied to the film and is partially converted into polymerized form by a curing process which takes place during the heating and compressing of the eye during the final forming thereof as will be described hereinafter.

The coated layer of cellulose nitrate having the pigmented gelatin coating 8 thereon is then stripped off the cellulose acetate backing and is cemented to a small bevelled transparent plastic disc 11, as diagrammatically shown in Fig. VI. The nitrate layer is preferably secured to the disc 11 by a coating of cement 12 of the same syrupy solution that the pigments are suspended in and is preferably secured to the disc 11 with the pigmented coating on the side of the nitrate layer 8 opposite the disc 11.

The edges of the stripped-off portion are then removed so as to cause the iris portion to conform to the contour of the disc which is substantially of the size of the finished iris to be formed. For example, the portion of the film having the iris developed thereon will be in the form of a square piece with the iris centrally thereof. When this is attached to the disc, the square portion is then cut away about the contour of the iris.

The disc 11 having the iris portion secured thereto is then secured in the recess 5 through the use of a doughy mixture 13 of a polymer and monomer essentially the same as that used in moulding the scleral portion 1. The disc 11 is pressed into the doughy mixture within the recess 5 with a sufficient amount of pressure to cause the doughy mixture to ooze out around the sides of the disc 11 as shown at 14 in Fig. VII, leaving a very thin underlayer 15 and causing the outer surface 16 of the disc to assume a substantially flush relation with the outer adjacent surface 17 of the scleral portion 1. Care is taken that the doughy mixture completely fills in the space surrounding the disc 11 as shown in said figure. The excess portion of the doughy mixture which oozes out is removed and the said eye at this stage is set aside until the doughy mixture becomes hard. This takes place mostly by evaporation at room temperature.

The assembly, after the doughy mixture has been allowed to become hardened, may be ground down to cause the surface of the oozed-out portion 14 to assume a relatively smooth, flush relation with the outer surface 16 and the adjacent outer surface 17. Care is taken during the forming of said flush surface to insure that the insert has a feather edge as illustrated at 18 in Fig. VIII. The effect of the bevelled contour edge of the disc 11 is to cause the insert surrounding the said disc to be of a wedge shape as illustrated at 19 with the result that the wedge increases the density as it progresses outwardly from adjacent the feather edge 18.

At the completion of the forming of the scleral portion 1 with the iris insert, the scleral portion, after having been properly finished by smoothing or grinding or other desirable surfacing, may be tinted to match the scleral portion of the normal eye. This is accomplished by painting a vein structure on said scleral portion simulating the visible vein structure of the normal eye, using pigments of the proper color in water which contains a suitable wetting agent such as soap or other known commercial wetting agents, that is, any known material which lowers the surface tension of water and which would have no injurious effect on the plastic. The scleral portion may also be tinted where most of the vein structure is located by using a suspension of pigments of the proper color in a methyl methacrylate monomer such as mentioned above and achieves the effect of many small practically invisible veins. The coating resulting from this tinting is then allowed to dry and harden and the outer surface of the scleral portion is then smoothened as mentioned above. The vein structure may also be formed by a solution such as described above for tinting the sclera.

The outer transparent layer or covering 3 is formed by placing a deposit of a doughy polymer and monomer mixture over the iris insert 2 and a portion of the ball portion 1 as shown in Fig. VIII. This is accomplished by placing a deposit of said doughy mixture in a mould having a mould aperture therein of the shape desired of the final eye, that is, the shape of the outer surface of the transparent coating 3 and then compressing the ball portion 1 having the iris insert 2 therein into said mould under the action of heat and pressure to cause the doughy polymer and monomer mixture to flow to the shape of the mould cavity. The parts are held in this relation under heat and pressure for a time interval sufficient to cause the complete assembly to join into a homogeneous structure with the said plastic composition hardened through the completion of polymerization and causing the complete curing of the iris and pigmented painted coatings.

The moulded eye is then removed from the mould, which mould may be of any conventional type not shown. The outer surface will be rough and slightly out of shape. To bring the eye back to the shape desired, the outer surface is ground off to remove the excess clear or transparent plastic and the said eye is then provided with a smooth polished surface of the shape desired such as shown in Fig. VIII.

The resultant eye, therefore, will be essentially of a plastic composition having a clear transparent coating overlying the iris and being curved substantially to the curvature of the cornea of the normal eye thereby causing said resultant eye to possess substantially the same optical characteristics as the corneal portion of said normal eye.

One of the unique advantages of the present construction is that the various parts of the eye are formed of plastic material having substantially the same coefficient of expansion so that the shrinkage, which takes place during the completing of the curing or polymerization of the shaped eye, will be substantially uniform so that there is less tendency or danger of separation of the various parts throughout their contiguous surfaces.

It is particularly pointed out that the structure set forth above comprises essentially three major parts fused into one so that the finished product is a one-piece all plastic eye. The resultant eye has three dimensional characteristics with depth similar to the real or normal eye of the individual and possesses substantially the same color characteristics of said eye.

Another feature of this type of eye is that surface reflections from the eye are soft and more life-like and are decidedly lacking in glare and artificial glassy appearance. The resultant eye is extremely resistant to fracture. The colors are non-fading and the eye in general is particularly resistant or impervious to socket secretions and to changes in temperature.

Another decided advantage is that the eye is light in weight, mobile and durable and is particularly non-irritating to the socket tissues.

The iris, due to the use of a photographic picture of the iris of the normal eye or to a photograph selected from a stock of negatives and which has the major characteristics of the individual's normal eye, has a more life-like and realistic appearance. Due to the fact that the picture portion of the iris has the colored pigments positioned so as to lie beneath said picture portion, it will cause the iris to possess the variation in brightness of the color of the iris as exists in the normal eye, this variation in brightness results from the superimposing of the light and dark parts of the photographic iris on the color and thereby greatly simplifies the reproducing of the appearance of the normal eye. The third dimensional effect previously mentioned above may be increased by increasing the thickness of the disc 11 thereby causing the distance between the iris pigmented layer and the outer surface of the cornea to be increased in the finished eye. This increased depth may also be obtained by forming the outer surface of the corneal portion to a shorter radius thereby causing the iris to appear as being at a greater depth. The depth may also be increased by initially forming the photograph of the iris portion more dense or darker during its initial development and by using lighter colored pigments for the undercolored layer thereby increasing the contrast between the pigments and the darker colored markings. This procedure may be reversed to decrease the depth if desired, thereby giving an additional control as to the characteristics of the finished eye.

Although methyl methacrylate has been referred to above as the preferred artificial plastic used in forming the eye, other known artificial resins may be used such as acrylic resins, methacrylic resins, methyl acrylate, butyl acrylate, polystyrene or the like or any known artificial resin capable of withstanding eye secretions and which, under conditions of use, will not irritate the socket tissues.

Although photographic stripping of the cellulose nitrate type has been set forth above as the preferred sheeting used in forming the photographic iris, it is to be understood that any known photographic means of the type embodying a relatively thin picture layer which may be stripped from the backing may be used. For example, a wet plate embodying a backing of glass having a thin picture layer that may be stripped from the glass may be used. Of course, in using such a plate the pigmented coating would be placed on the layer that is stripped from the glass backing. Another method of forming the iris portion is that of placing a coating of photographic emulsion directly on the undersurface of the disc 11 and exposing it to the iris pattern desired. In this instance the picture layer is directly on the disc and merely requires the placing of a pigmented coating thereon.

It is particularly pointed out that when initially forming the pigmented layer 9 on the film stripping care should be exercised that the surface texture of the coating be substantially uniform so as to insure more intimate surface to surface relation of said pigmented coating and the layer 8. This is accomplished by forming the pigment particles more uniform in size and by controlling the amount of acrylic in the paint mixture so that it will be of a very syrupy nature and can be more uniformly applied.

It may be desirable in some instances to provide the undersurface of the layer 8 with a relatively thin coating of cellulose nitrate prior to placing the pigmented coating thereon. This is to form a more positive bond between the pigmented layer 9 and the layer 8.

The ball portion 1 is formed to substantially the shape and size of the eye of the individual which is to be replaced and the surface of said portion 1 from adjacent the inner limits of the scleral portion is preferably given a rough texture as by grinding.

Suitable recesses 20 are formed in the ball portion 1 in substantially diametrically opposed relation with each other as shown in Figs. I, II, VIII and IX as by drilling or the like and extend inwardly of the ball portion 1 at an angle so as to cause the longitudinal axes of said recesses 20 to converge toward each other in a direction rearwardly of the ball portion 1 as illustrated best in Fig. VIII. The said ball portion 1 is also provided with passageways 21 extending in a direction substantially transversely of the longitudinal axes of the recesses 20 as shown in Figs. I and II and may be formed by drilling or the like. These recesses 20 and passageways 21 are used in attaching the motive muscles of the eye to said ball portion. It is particularly pointed out that the ball portion 1, or portion sometimes called an implant portion, is shaped so that when placed within the cavity of the eye of the individual for whom the artificial eye has been formed, it will have substantially the same freedom of movement as the normal eye and the recesses 20 and passageways 21 formed in said ball or implant portion 1 as set forth above are used as attachment means for securing the external and internal rectus muscles as well as the superior and inferior rectus muscles to said ball or implant portion.

The method employed in removing the eye of an indivdual and of replacing said eye with an artificial eye embodying the present invention is substantially as follows:

A cut is formed through the conjunctiva about the contour of the iris of the eye to be removed. The conjunctiva is then rolled backwardly over the sclera to expose the external and internal rectus muscles as well as the superior and inferior rectus muscles.

A very fine tantalum wire 22 is then threadedly attached to each of the muscles adjacent their point of connection to the eyeball. Each muscle is then cut clear of the eyeball after the tantalum wire is attached thereto. The eyeball is then removed from the socket.

The artificial eye embodying the invention and which has been preformed so as to have the characteristics of the normal eye is then placed in the socket.

Thin metallic plates 23 of tantalum material, as shown in Fig. X, are formed with a plurality of openings 24 and are each provided with a tongue 25. These tantalum plates 23 are attached to each of the respective muscles 26 by stitching the tantalum wire 22 through the openings 24. The tongues 25 of the plates attached to the respective muscles are then positioned within the respective recesses 20 and the tantalum wire 22 is then threaded through the passageways 21 and by forming further stitching through the adjacent ends of the muscles 26 and through the openings 24.

This securely attaches each of the respective muscles to the ball portion 1. It is particularly pointed out that one muscle is first attached to the ball portion 1 by extending the tongue 25 into the recess 20 by rotating the ball in the socket an amount sufficient to permit said tongue 25 to be placed in its respective recess 20 and by thereafter bending the tongue so as to position the plate 23 and the adjacent end of the muscle in adjacent relation with the side surface of the ball portion 1 as shown in Fig. IX. The above stitching through the passageways 21 and further stitching through the end of the muscle and openings 24 are then made.

After all of the muscles have been attached to the artificial plastic eye as set forth above the tantalum wire is threaded through the tenon's capsule adjacent the location where the capsule joins the conjunctiva, that is, adjacent the points of connection of the muscles with the eyes. The conjunctiva illustrated diagrammatically at 27 is then drawn upwardly over the scleral portion of the eye and is held in overlying relation with the scleral portion by forming sutures in the conjunctiva adjacent the inner and outer canthi of the eye.

The eye tissues are then allowed to heel whereupon the conjunctiva will assume a relatively taut intimate overlying relation with the scleral portion of the eye and the said eye, reacting to the normal functions of the muscles attached thereto, will move in a manner simulating the movements of the normal eye and will have an appearance simulating that of the normal eye. The said eye will permanently remain in fixed position in the eye socket and will possess all of the motive functions and appearance of the normal eye.

Due to the fact that the inner surface of the ball portion 1 is formed relatively rough, the tissues of the eye socket will tend to adhere thereto and cause the said eye to have a relatively normal function.

Although applicant has referred to the use of tantalum plates of the type illustrated in Fig. X and has set forth only one particular means and method of securing the muscles to the eyeballs, it is to be understood that various different means and methods may be employed within the scope of the invention.

It is particularly pointed out that the perforated portion 23 of the plate is formed substantially to the width of the end of the muscle to which it is attached and that when attached to the muscle the tongue 25 protrudes outwardly of the end of the muscle. This insures that the muscles are of substantially their original length and that they are attached to the artificial eye at substantially the same location with respect thereto as they were attached to the eye which has been removed. By extending the tongue inwardly of the recesses 20 to the extent that the shouldered end of the plate 23 engages the side wall of the eye ball and thence bending the plate downwardly as shown in Fig. IX, accurate location of the point of connection of the muscle with the eye ball is assured.

It is particularly pointed out that the finished eye as shown in Figs. II and VIII has a pearlike shape with the said eye in the vicinity of the front portion thereof, designated by the numeral 30, being built up annularly so as to provide a backing support for the eyelids whereby the eyelids will assume a more normal relation with the artificial eye when it is secured in place.

The ball portion 1 tapers rearwardly as indicated at 31 to provide clearance whereby the said ball or implant portion will have free universal movement in the socket whereby it will respond more easily to the full extent of movement imparted by the motive muscles. The main ball or implant portion 1 functions to fill in the cavity formed by removing the human eye and serves to retain the tissues of the socket in place and to cause the front or scleral and corneal portion of the eye to assume a position simulating that of the normal eye in its socket, that is, it prevents the sclera and cornea of the artificial eye to be set in or to protrude outwardly too far with respect to the related position of the normal eye.

It is to be understood that the ball or implant portion is controlled in size so as to bring about this desired result. Due to the fact that the front portion 30 of the eye is built up as illustrated at 30, the lids will be prevented from sinking into the eye cavity and will be supported so as to have the appearance of the lids of the normal eye.

It is particularly pointed out that the conjunctiva, diagrammatically illustrated at 27, does not cover the entire scleral portion of the artificial eye so that when the eye has properly healed and the lids assume their normal position, the scleral portion of the artificial eye as well as the iris will be visible with the lids tending to substantially completely cover the conjunctiva so that the said conjunctiva under normal conditions will not be visible.

From the foregoing description it will be seen that simple, efficient and economical means and methods have been provided for accomplishing all of the objects and advantages of the invention.

Having described our invention, we claim:

1. An artificial eye adapted to be joined to the motive muscular structure of the eye of an individual which it is to replace, said artificial eye comprising a ball portion of plastic material shaped substantially to the size and shape of said eye of an individual which it is to replace and to substantially fill in the area created by the removal of said eye, said ball portion having a recess therein, an iris in said recess of substantially the size, shape and color of the iris of the normal eye of said individual, and having a scleral portion surrounding said iris simulating the scleral portion of the normal eye of the individual, a coating of transparent plastic material over said scleral portion and iris and having an outer surface shape simulating the surface shape of said normal eye and connection means carried by said ball portion to which the motive muscular structure of the eye being replaced by said plastic eye may be directly connected.

2. An artificial eye comprising a plastic assembly embodying a ball portion substantially of the size and shape of the normal eye of an individual and having a scleral portion simulating that of the normal eye and having a recess therein, an iris in said recess, said iris simulating that of the normal eye, a button of transparent plastic material overlying said iris in said recess, a coating of transparent plastic material overlying a portion of said scleral portion and the button insert and having an outer surface of a shape simulating that of the normal eye and connection means carried by said ball portion to which the motive muscles including particularly the external, internal, superior and inferior rectus muscles may be attached, said connection means being arranged to position said muscles in their substantially normal relation.

3. An artificial eye comprising a plastic assembly embodying a ball portion of substantially the size and shape of the ball portion of the normal eye, said ball portion having a scleral portion simulating that of the normal eye and having a recess therein, an iris in said recess simulating that of the normal eye, a button insert of transparent plastic material overlying said iris in said recess, an annular portion of wedge-like cross section surrounding the iris and button insert with the apex of the wedge extending in a direction toward the center of said iris and with said wedge shaped cross section tapering outwardly to a base disposed adjacent the outer part of said annular portion, a coating of transparent plastic material overlying said iris and button insert and having an outer surface shaped substantially to the outer surface shape of the normal eye and connection means carried by said ball portion to which the external and internal rectus muscles as well as the superior and inferior rectus muscles may be attached with the location of said connection means being so controlled that the attachments of said muscles may be made substantially at the points of attachment of said muscles to the original eye of the individual.

4. An artificial eye composed essentially of plastic material comprising a portion shaped to fit within the socket, said portion having a scleral portion and a combined iris and corneal portion carried thereby and formed to simulate said portions of the normal eye and having connection means to which the motive muscular structure of the eye being replaced by said plastic eye may be attached, with said scleral portion being adapted to be at least partially encased by the conjunctiva of said replaced eye and with said connection means being arranged to position said muscles in substantially their natural relation.

5. A device of the character described comprising a ball portion of translucent plastic material having a coating of transparent plastic material over the front portion thereof, an iris secured between said translucent and transparent portion and said translucent portion having connection means to which the motive muscles of an eye may be attached and in substantially their natural relationship.

6. The method of forming an artificial eye of the character described comprising forming a ball or implant portion of translucent plastic material, forming a recess in said ball portion at the location where the iris is to be positioned, forming an iris member with portions of different density and with a pattern simulating that of the normal eye, forming a pigmented coating on said iris simulating the color pattern of the normal eye, securing said iris to a transparent plastic disc, securing said disc in said recess with the pigmented coating lying between the base of the recess and the iris and with the iris lying between the pigmented coating and the disc, forming a scleral portion on said ball portion surrounding the iris having characteristics simulating the characteristics of the scleral portion of the good eye, forming a transparent coating over said iris and scleral portion and simultaneously shaping the outer surface of said transparent portion substantially to the outer surface of the normal eye and providing said ball or implant portion with connection means to which motive muscles of the eye to be replaced by said artificial eye may be attached and arranged in substantially their natural relationship.

7. An artificial eye comprising an implant portion shaped to fit within the eye socket, said implant portion having a recess on its anterior side and further having means by which the eye muscles may be secured to said implant portion, and an eye representation mounted on said anterior side of the implant portion and having a part thereof seated in said recess.

8. An artificial eye comprising an implant portion having a portion simulating the human eye on its forward side and connection means having portions thereof embedded in said implant portion at spaced locations and having exposed portions, and suture means by which each of the respective motive muscles of the eye may be attached to said exposed portions.

9. An artificial eye comprising a body portion shaped to fit within the eye socket from which the eye has been removed, a prosthesis on its forward side, and connection means having a part thereof secured in the material of said body portion and an outwardly disposed part together with securing means by which the motive muscular structure of the eye may be secured thereto.

10. A device of the character described comprising a body portion shaped to fit within the socket of an eye which has been removed and having a plurality of plate-like members secured at spaced locations about the periphery of said portion, said plate-like members having means by which the motive muscles of the eye may be attached thereto.

11. A device of the character described comprising a body portion shaped to fit within the socket of an eye which has been removed and having muscle attachment means disposed about the periphery thereof, said means having portions of a width substantially that of the normal width of the muscles for locating the individual muscles in predetermined locations with respect to the body portion and further embodying means for securing the individual muscles to said body portion when in said locations.

12. An artificial eye composed essentially of plastic material and possessing characteristics simulating the various characteristics of the normal eye as to appearance, size and shape, said eye having its front portion built up annularly to provide a backing support to give the eyelids greater fullness when the said eye is in position of use and tapering rearwardly so as to have a substantially pear-shape providing clearance for the motive structure of the eye, the said eye having connection means to which the motive muscular structure of the eye being replaced by said plastic eye may be attached, with said connection means being so placed that said motive structure of the eye may be directly attached thereto and at points substantially approximating that of its attachments to the original eye.

13. An artificial eye composed essentially of plastic material, said eye comprising an implant portion shaped to fit within the eye socket of the eye to be removed and having an iris and scleral portion on the anterior portion thereof simulating that of the normal eye of an individual, and said implant portions having separate connection means mounted thereon by which it may be attached to the motive muscles of the removed eye, with said connection means being disposed about the implant portion so as to permit the motive muscles to be attached to the artificial eye substantially at the points at which they were attached to the original eye.

14. An artificial eye including a body shaped to fit an eye socket in which said body is to be placed and separate connection means including an exposed portion having a plurality of perforations therein, for attachment of the rectus muscles, secured to said body, an eye prosthesis and means for holding it on the face of the body.

15. A device of the character described comprising a body to fit within the socket of an eye which has been removed and having connection means mounted thereon including an exposed portion provided with a plurality of connection openings to which motive muscles of the eye may be attached in substantially their natural relationship.

16. An artificial eye comprising an implant portion shaped to fit within the eye socket, said implant portion having a simulation of the human eye on its forward side, said implant portion further having spaced means about its periphery at locations by which the individual muscles may be secured separately to the implant portion in substantially their normal spaced relation about a natural eye.

17. An artificial eye comprising an implant portion shaped to fit within the eye socket, said implant portion having a simulation of the human eye on its forward side, said implant portion further having recessed portions spaced about the periphery thereof, and eye muscle attachment means each including a portion to which a respective muscle may be secured and a portion fitting within a respective one of said recessed portions.

18. A replacement member for an eye comprising an implant portion and separate connection means having portions thereof embedded in said implant portion at spaced locations and having exposed portions, and separate securing means by which each of the respective motive muscles of the eye may be attached to said exposed portions.

19. A replacement for an eye comprising a body portion shaped to fit within the eye socket from which the eye has been removed and separate connection means having a part thereof secured in the material of said body portion and an outwardly disposed part together with separate suture means by which the motive muscular structure of the eye may be secured thereto.

20. A device of the character described comprising a body portion shaped to be placed within the socket of an eye which has been removed, said body portion having separate connection means mounted thereon, and separate securing means for engaging and securing the motive muscles of the eye which has been removed to said separate connection means mounted on the body portion.

21. A device of the character described comprising a body portion shaped to be placed within the socket of an eye which has been removed, said body portion having connection means carried thereby including a part shaped to overlie an adjacent surface of said body portion, and means connecting said part to said body portion to retain said part in said overlying relation whereby a rectus muscle may be operatively associated with said part, said part having a portion with an exposed surrounding area about which separate means is extended and threaded through the rectus muscle to secure said muscle to said portion.

FRITZ W. JARDON.
ALBERT D. RUEDEMANN.

(References on following page)

REFERENCES CITED

The following references are of record in the file of this patent:

UNITED STATES PATENTS

| Number | Name | Date |
|---|---|---|
| 1,763,312 | Marcus | June 10, 1930 |
| 1,993,121 | Travers | Mar. 5, 1935 |
| 2,322,117 | Dimitry | June 15, 1943 |

FOREIGN PATENTS

| Number | Country | Date |
|---|---|---|
| 19,625 | Great Britain | Nov. 1, 1892 |

OTHER REFERENCES

Article in British Journal of Ophthalmology, vol. 28, November 1944, pp. 573 and 574, entitled: "Plastic Spheres for Implantation Into Tenon's Capsule In the Frost-Lang Type Operation For Enucleation Of The Eyeball," by R. E. Wright. (A copy is in Div. 55 of the Patent Office.)